United States Patent [19]
Birdsell

[11] Patent Number: 6,003,929
[45] Date of Patent: Dec. 21, 1999

[54] LOAD CONFORMABLE TARP

[76] Inventor: Douglas Birdsell, 4002 1/2 Riverside Dr., Burbank, Calif. 91505

[21] Appl. No.: 09/108,885

[22] Filed: Jul. 1, 1998

Related U.S. Application Data

[60] Provisional application No. 60/040,010, Nov. 3, 1997.

[51] Int. Cl.[6] ..................................................... B60P 7/04
[52] U.S. Cl. ............................. 296/100.16; 52/3; 150/166
[58] Field of Search .............................. 296/100.16; 52/3; 150/166

[56] References Cited

U.S. PATENT DOCUMENTS

| | | | |
|---|---|---|---|
| 3,615,117 | 10/1971 | Neidlinger | 296/100.16 |
| 4,598,883 | 7/1986 | Suter | 150/166 |
| 5,050,924 | 9/1991 | Hansen | 52/3 |
| 5,632,223 | 5/1997 | Bray et al. | 150/166 |
| 5,752,736 | 5/1998 | Nodier | 296/100.16 |

*Primary Examiner*—Gary C. Hoge
*Attorney, Agent, or Firm*—Reidlaw, L.L.C.; John S. Reid

[57] ABSTRACT

A load conformable tarp includes a plurality of strap adjustment assemblies for adjusting the effective length of associated adjusting straps. Each adjustment strap assembly includes an adjustment assembly for adjusting the length of an associated adjustment strap, as well as a locking mechanism for securing a free end of the adjusting strap, the other end being fixed with respect to the tarp base material. Each adjustment assembly preferably includes a pulley throughwhich one end of the adjustable strap is looped, one end of the adjustment strap preferably being fixed to the base material, the other end being free and configured to be engaged in various positions by the locking mechanism, thus forming an adjustable strap loop of variable size. The adjustment mechanism more preferably includes a sheath to cover the adjustable strap loop, and tension members running from the pulley and the locking mechanism, respectively, to the periphery of the tarp, where they terminate in anchors which can be used to secure the tarp. The invention further includes a device for retrofitting existing, non-load conformable tarps, to make them loadconformable. The device includes all of the features of the load conforming tarp, but instead of attaching the strap adjustment apparatus to the tarp or base material, it is attached to a backing material which can itself be attached to tarp base material.

16 Claims, 9 Drawing Sheets

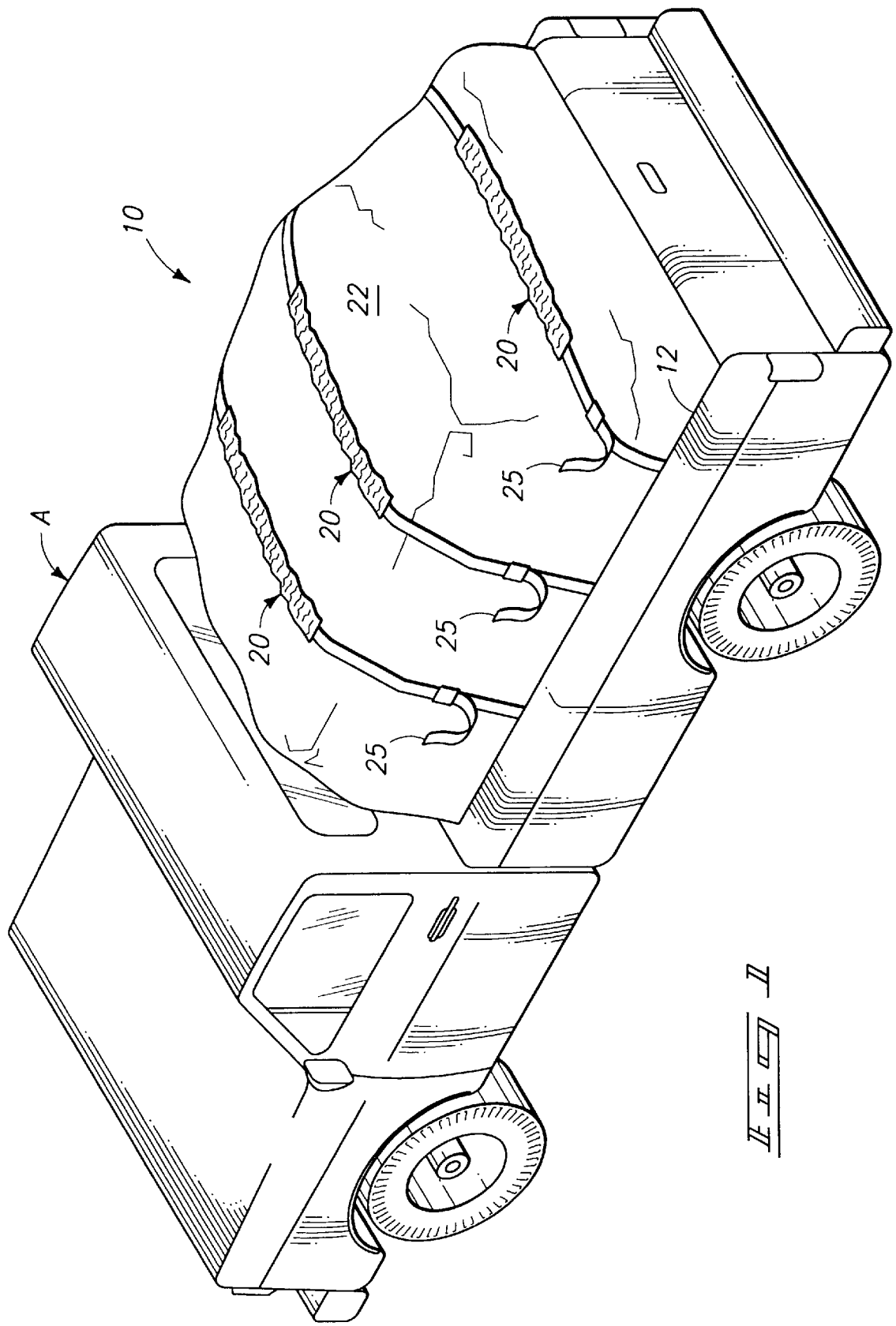

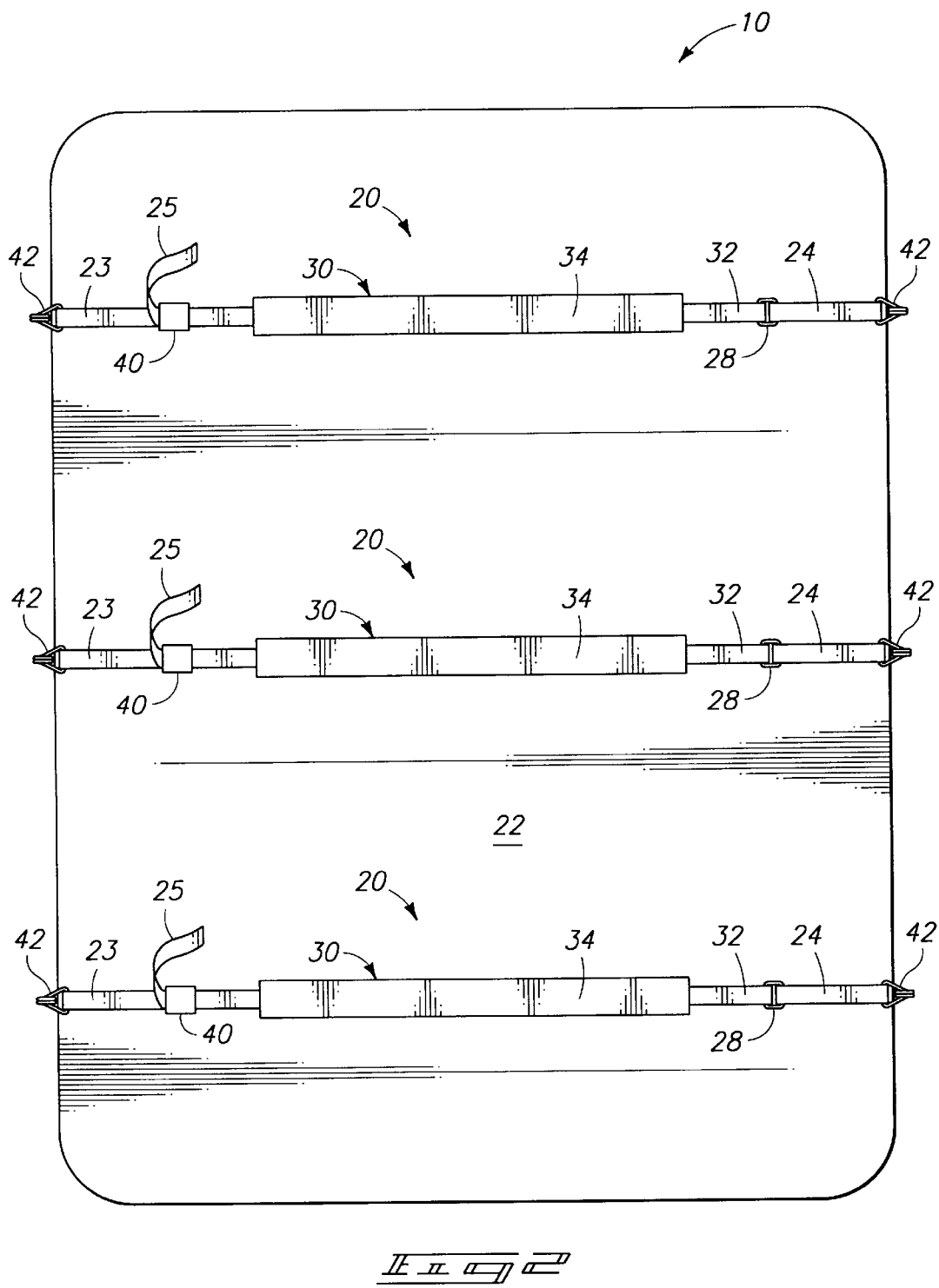

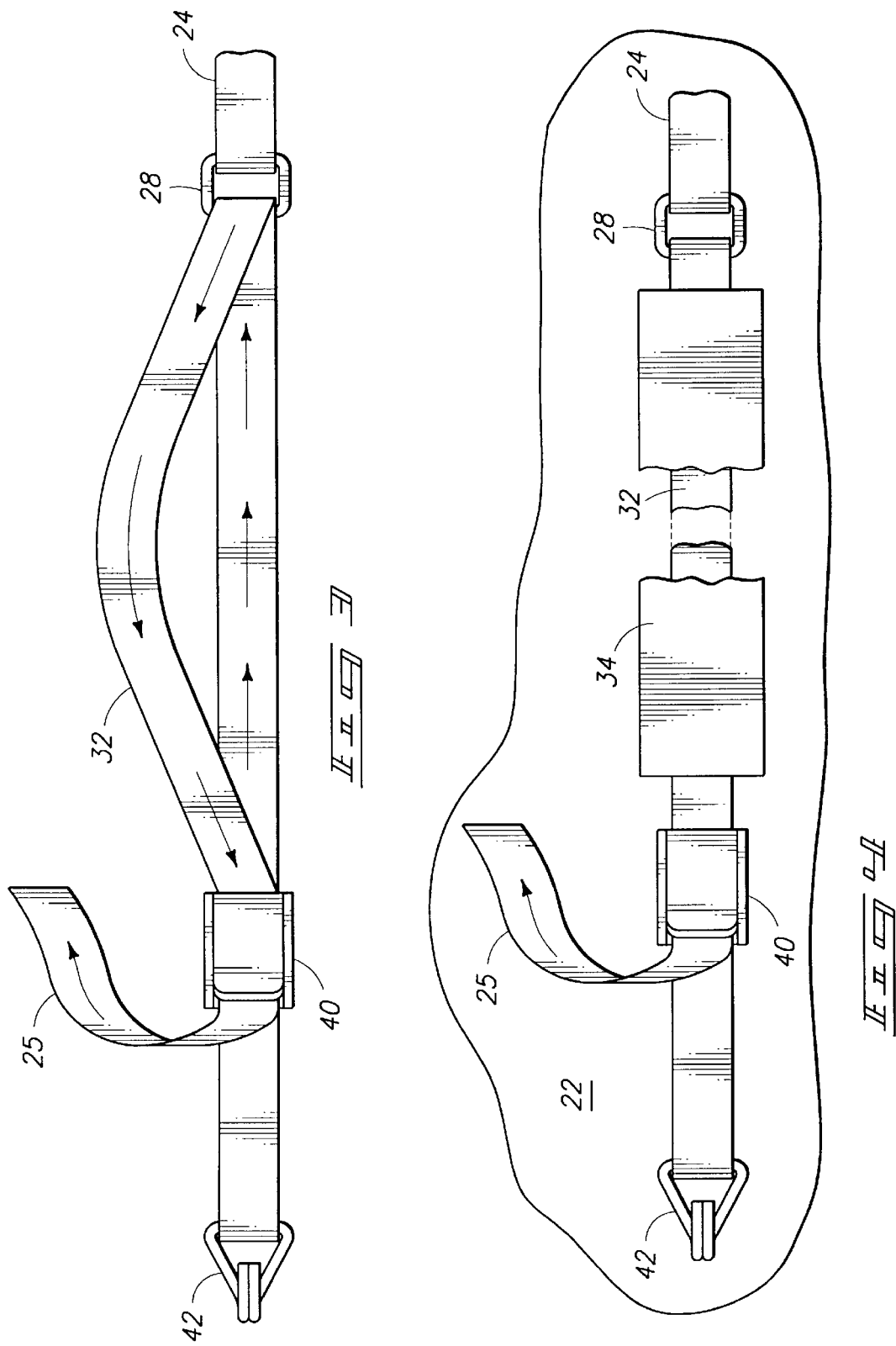

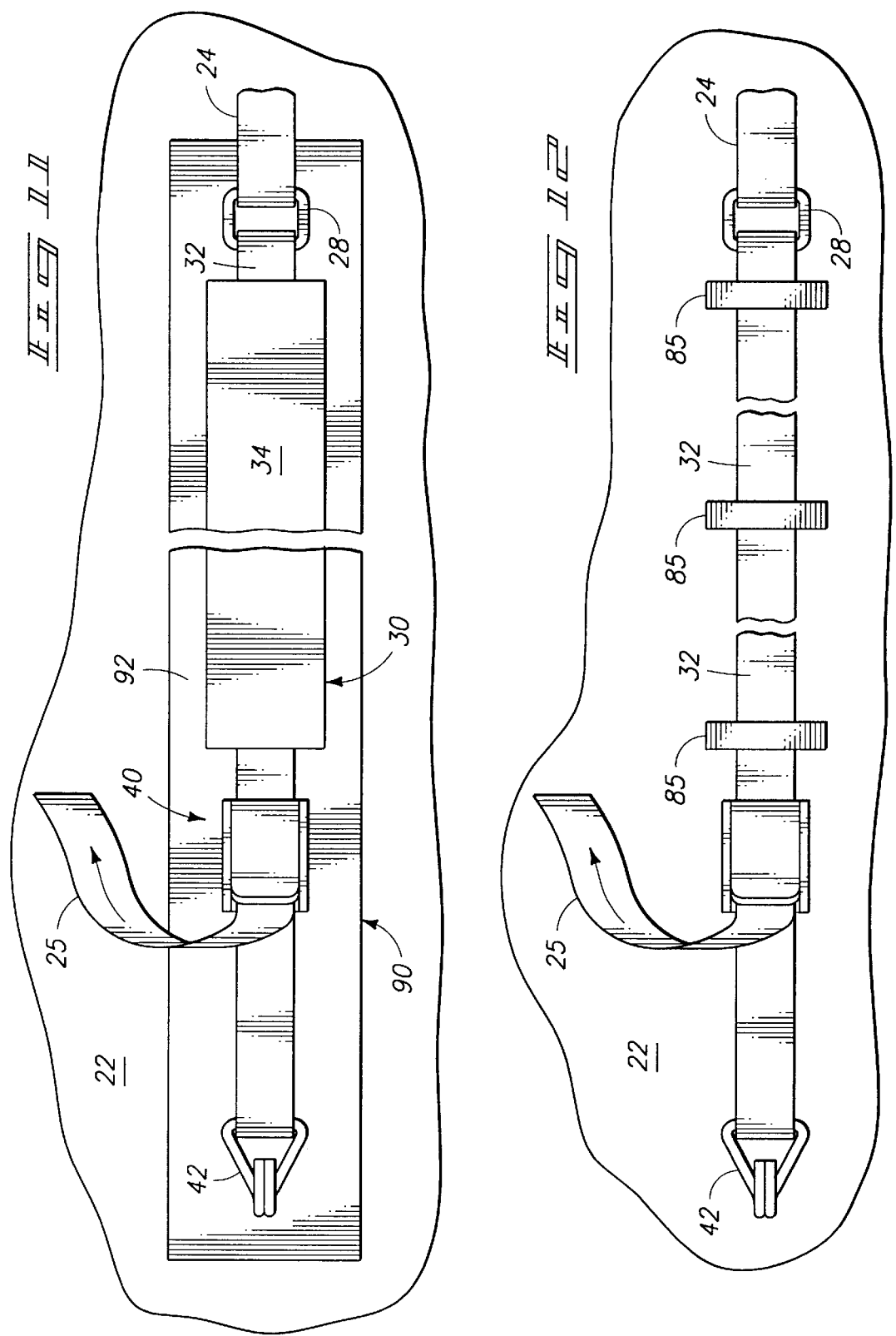

LOAD CONFORMABLE TARP

CROSS REFERENCE TO RELATED APPLICATION

This application claims priority in part to U.S. Provisional Application Ser. No. 60/040,010, filed Nov. 3, 1997.

TECHNICAL FIELD

This invention relates to tarpaulins that can be secured over various size loads or items and more specifically, to tarpaulins which can be adjusted to conform to the general shape of the object being covered.

BACKGROUND OF THE INVENTION

When a load is carried in a truck or the like, it is often desirable, and frequently required by law, that the load be covered. Typically loads are covered with a tarpaulin (or "tarp," as will be used herein). An example is the hauling of garden debris in a pick-up truck, where it is desirable to cover the load with a tarp to prevent debris from blowing out of the bed of the truck and onto the road. Current tarpaulins available on the market can be difficult to secure over loads. Often tarps will billow due to the lowering of pressure on the outside of the tarp from air velocity over the tarp, as a result of the velocity of the truck. Not only does such billowing result in poor securing of the load, but it is hard on the tarp, it is noisy, is visually distracting, and reduces fuel mileage due to increased wind resistance.

Products to date for covering loads have either focused on restraining items such as ropes and elastic shock cords (or Bungee cords), or covering items such as fixed size tarps. Restraining items alone may be insufficient to secure the load, and do not protect the load from weather. The use of Bungee cords or ropes in conjunction with a fixed size tarp for securing a load fails to be effective when the dynamic effects of the wind during transportation cause the tarp to pull out from under the cord, or by reason of the fixed size tarp being difficult to secure in a uniform manner.

Thus, what is needed is an effective way to secure a tarp about a load during transportation.

SUMMARY OF THE INVENTION

The invention allows the user to place the tarpaulin over an item and then simply pull on straps to reduce the effective width or length of the tarpaulin. This reduction in effective width or length allows the tarpaulin to conform to the general shape of the load over which the tarp is placed. The strap system is incorporated into the tarpaulin material and has the effect of bunching up the tarpaulin until secured over the load. By incorporating the strap into the tarpaulin material, this invention allows the user to place the tarpaulin over an item while the tarpaulin is in its flat unaltered state. After the tarpaulin is in place, the user attaches the outer edge of the tarpaulin/strap to a fixed point, e.g., the side of a truck, trailer, etc. After attaching the outer edge, the user pulls a strap and the tarpaulin material bunches up like a drawstring/curtain until secure over the load. This system reduces the effective size of the tarpaulin to fit securely over the load. The design is best used on a tarpaulin, but can also be applied to other material covers.

The purpose of the load conformable tarpaulin is to cover items from weather related elements as well as to secure the covered items.

BRIEF DESCRIPTION OF THE DRAWINGS

Preferred embodiments of the invention are described below with reference to the following accompanying drawings.

FIG. 1 is an environmental view showing a tarpaulin fabricated in accordance with the disclosed invention covering a load in the bed of a pick-up truck.

FIG. 2 is a plan view of one embodiment of a tarp of the present invention having single cross-tarp strap arrangements.

FIG. 3 is a diagrammatic detail of the adjustment portion of an adjustable strap used with the present invention, showing the shortening of the effective length of the adjusting strap.

FIG. 4 is a plan view showing the adjustable strap of the present invention.

FIG. 11 is a plan view of an adjustment strap arrangement in accordance with the present invention which can be used to retrofit a prior art tarp.

FIG. 12 is a plan view of an alternate embodiment of the invention wherein the tarp is secured to the tarp by small tabs.

DETAILED DESCRIPTION OF A PREFERRED EMBODIMENT OF THE INVENTION

Figure 5:
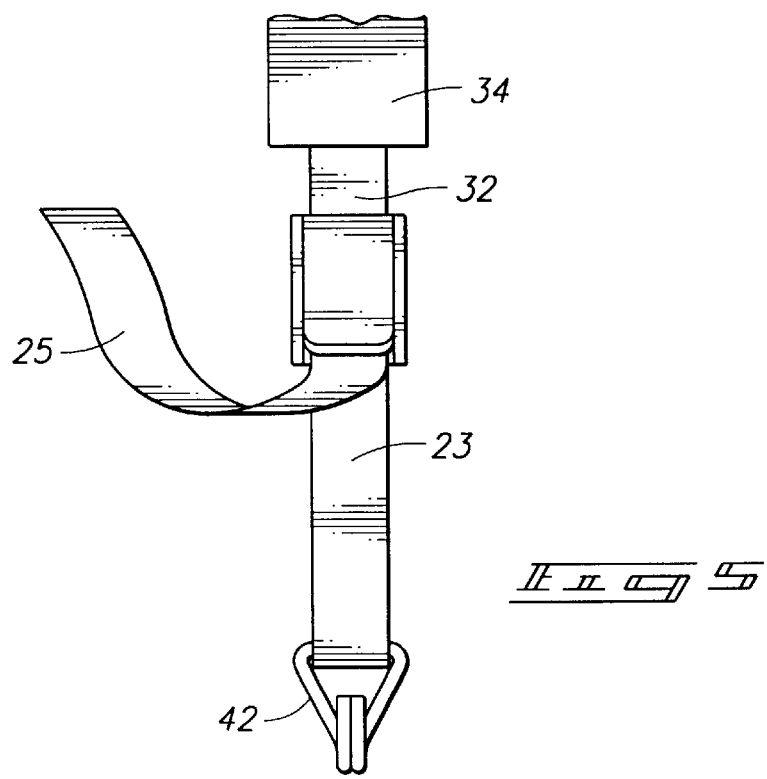
FIG. 5 is a detail plan view of one embodiment of an anchoring mechanism of the present invention.

The invention is primarily the relationship between a series of straps (e.g., nylon material) and a tarpaulin cover (e.g., synthetic or natural organic materials, or waterproof fabric) as shown in FIG. 1 wherein a tarp 10 is shown fitted over a load (which is obscured in the drawing by the tarp) in the bed of a pick-up truck A. The tarp comprises a plurality of adjustable straps 20 and a base piece 22. The base piece can be canvas, plastic, or other material from which covers can be made. The relationship between the strap 20 and the base piece 22 allows the user to determine the relative effective size of the tarpaulin 10, as will be more fully described below. Generally, when the end-piece 25 is pulled, the base material 22 is caused to be drawn in on itself, thus conforming the base material 22 about the load.

Turning to FIG. 2, a first embodiment of the invention is shown. This first embodiment comprises tarp material or base material 22 onto which is attached a plurality of adjusting strap assemblies 20. In the embodiment shown, the tarp comprises three cross-straps having a single adjustment locking mechanism 40 for each strap. This configuration is preferably employed in applications wherein forces exerted on a first end of the strap assembly are easily transmitted to the other end. An example wherein such a tarp is intended for use is in covering small to intermediate loads in the bed of a pick-up truck, as shown in FIG. 1.

Figure 8:
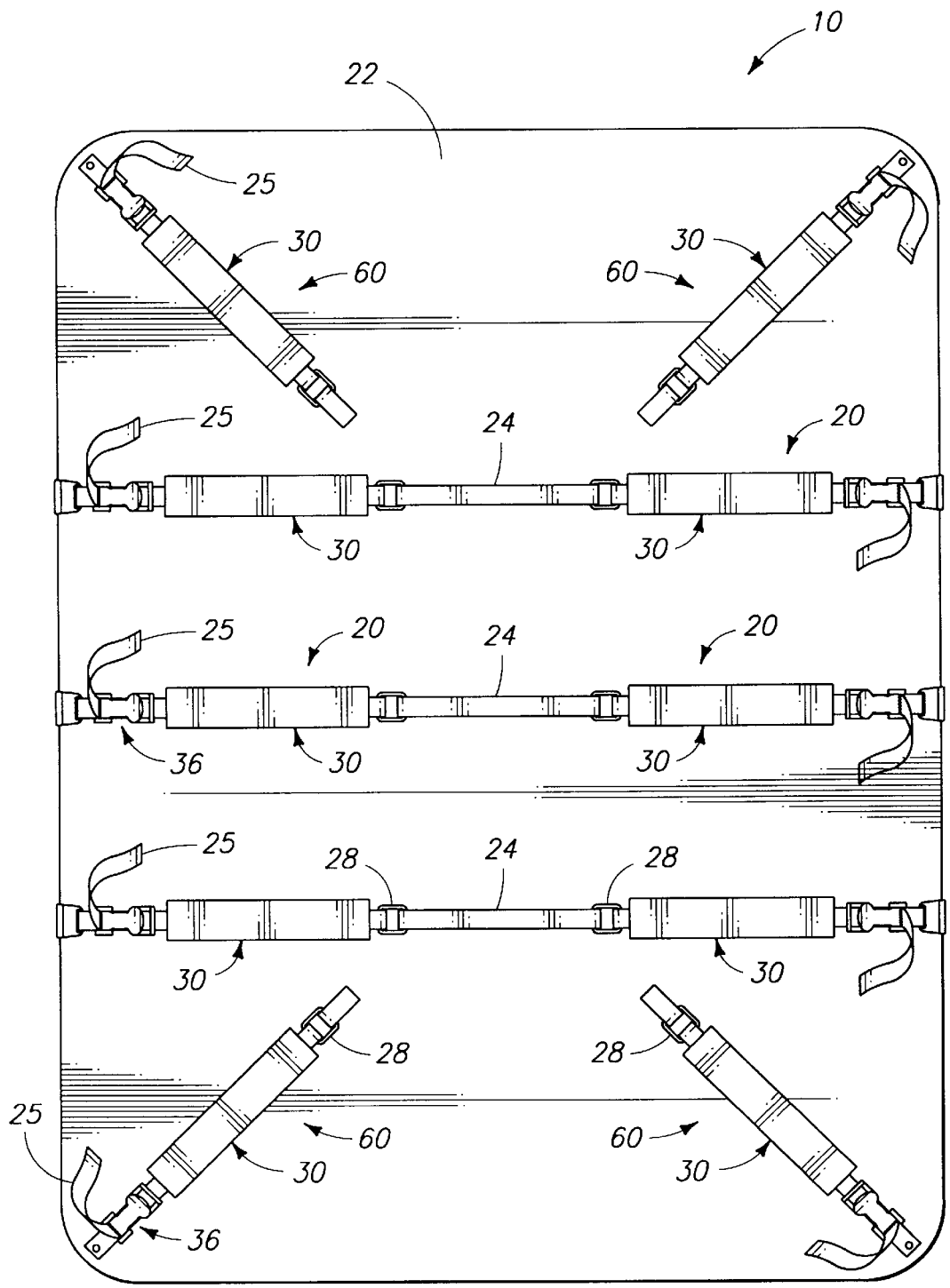
FIG. 8 is a plan view of an alternate embodiment of a tarp of the present invention having double cross-tarp strap arrangements as well as corner straps.

Briefly turning to FIG. 8 an alternate embodiment of a tarp in accordance with the present invention is shown. The tarp of FIG. 8 comprises a plurality of cross-tarp strap assemblies 20, each having two adjustment assemblies 30. Further, the tarp of FIG. 8 comprises corner adjustment assemblies 60, each having a single adjustment assembly 30. Such a tarp is intended for use in applications wherein the single cross-strap embodiment of may not effectively draw the tarp material about the load. Such can occur where the contours of the load would cause forces in the strap assembly to be imparted onto the load, and not transmitted through the straps, or where the tarp is large in size and frictional forces cause the force on one end of the strap to be dissipated before effectively reaching the other end of the strap. An example of an application wherein a tarp as shown in FIG. 8 would be used is in covering boxy loads such as crates and the like, or for covering loads on tractor-trailer trucks.

Returning to FIG. 2, the tarp 10 comprises a plurality of adjusting strap assemblies 20. Each adjusting strap assembly comprises an adjustment assembly 30 which is used to effectively shorten a dimension of the tarp by drawing the tarp in on itself in the manner of a drawstring. Each adjustment assembly 30 comprises an adjusting strap 32 and advantageously provides a sheath 34 covering the adjustment strap 32. Each adjustment assembly further comprises a pulley 28 about which is looped the adjusting strap, and a locking mechanism 40 for securing the free end of the adjusting strap. Each adjustment assembly 30 can further comprise at least one of the two tension straps 23 and 24 which are shown. The tension straps cause the force imparted to the adjusting strap to be transmitted to the edge of the tarp where the tension members terminate. Each adjustment strap assembly is advantageously provided with anchors 42, allowing the tarp to be secured to in place.

Turning to FIG. 3, a diagram showing the configuration of the adjusting strap 32, the locking mechanism 40, and the pulley 28 are shown. The adjusting strap is preferably secured at a first end at or near the locking mechanism 40; the second end of the adjusting strap 25 remains free, but is passed through the pulley 28 and the locking mechanism 40. The pulley can comprise a simple ring secured to the base material and about which the adjusting strap can be looped to produce an adjusting strap loop of variable size, as shown. The free end 25 of the adjusting strap 32 can thusly be temporarily held in place, and when freed and pulled upon, will cause the adjusting strap 32 to pass through the pulley 28 in the direction shown by the arrows. If the first end of the adjusting strap is held in relative fixed position by virtue of anchor 42, pulling on the loose end 25 of the adjusting strap 32 will cause the pulley 28 to be pulled in the direction of the anchor 42. Tension imparted onto the pulley 28 by the adjusting strap 32 will be imparted to the tension member 24, thus causing the tension member to likewise move towards the anchor 42. However, if the tension member 24 is secured in position, as for example by another anchor on the other side of the tarp, then the flexible material of the tarp will be caused to bunch up, causing the tarp to draw about whatever is beneath it.

As shown in FIG. 3, the tarp 10 can be fabricated without the sheath 34. FIG. 12 shows an embodiment wherein the sheath is replaced by tabs 85 which act similar to belt loops. However, preferably the tarp includes the sheath, as indicated in the detail of FIG. 4. A sheath 34 protects the strap 32, keeps the strap from shifting off of the load, and protects the strap from wind forces during travel. The sheath also provides stiffening for the tarp in order to help it resist deconformance due to wind loads. In the preferred embodiment shown in FIG. 4, the sheath 34 is secured over the strap 32 in such a manner that a pocket is formed under the sheath in which the strap may freely move. The sheath 34 may be attached in such manner by gluing, sewing, fusing, grommeting, etc. the edges (but not the ends) of the sheath to the tarp material 22. As an alternative to the sheath, but still preferable to using no sheath, intermittent loops 85 as shown in FIG. 12 can be provided. Other strap securing devices can be used to hold the strap into close proximity to the base material.

In a less preferred embodiment, the adjusting strap 32 can be secured at its first end to a point on the tarp, without the use of the pulley 28 or the tension member 24 shown in FIG. 3. In this case, the fixed end of the adjusting strap 32 can be attached to a first side of the tarp (not shown in this figure), while the second end and the locking mechanism are located near the opposite side. Pulling on the loose end will cause the tarp to draw about the load. However, the preferred embodiment of the adjustment assembly 30 comprises the pulley 32 and sheath 34. The pulley provides additional mechanical advantage for securing the tarp tightly about a load.

The tension members 23 and 24 of FIG. 2 are attached to the tarp 10 at a first and second end of the tension member, and are more preferably attached to the tarp along the entire length of the tension member. Tension members 23 and 24 can be attached to the tarp material 22 by any known method, such as by sewing, grommets, glue, fusing, etc.

Figure 6:
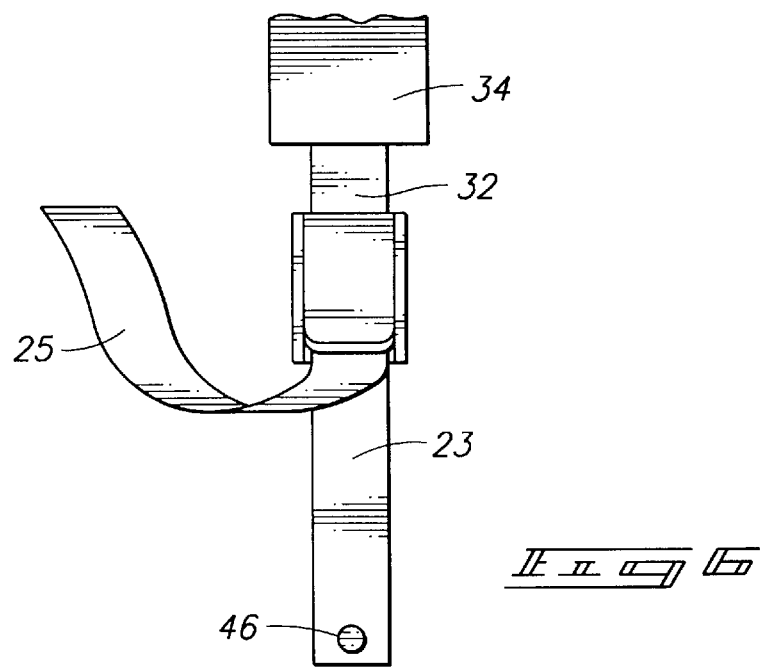
FIG. 6 is a detail plan view of a second embodiment of an anchoring mechanism of the present invention.
Figure 7:
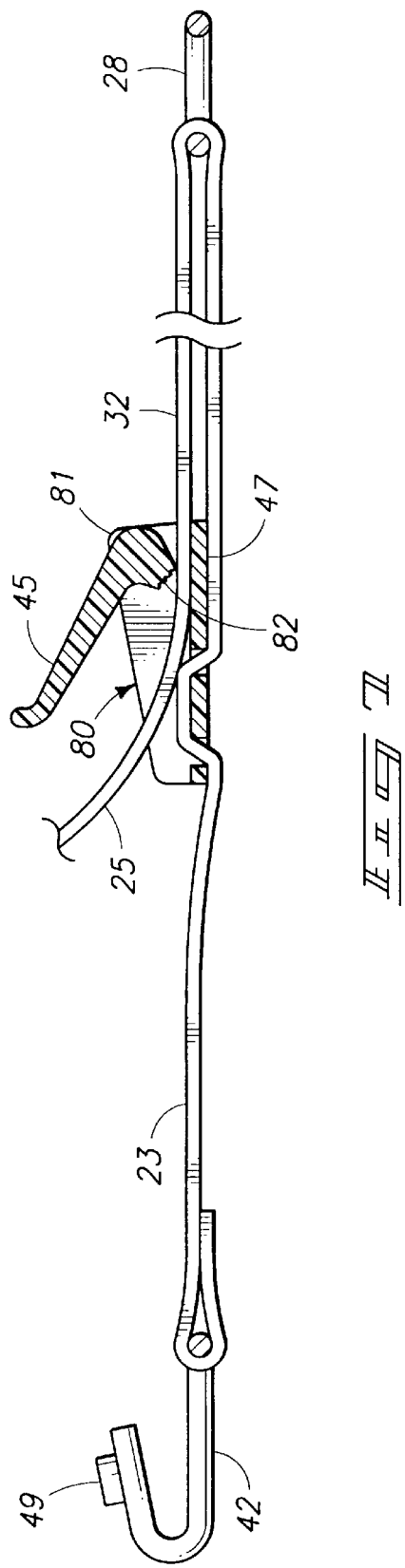
FIG. 7 is a side elevational view of the locking mechanism of the present invention.
Figure 9:
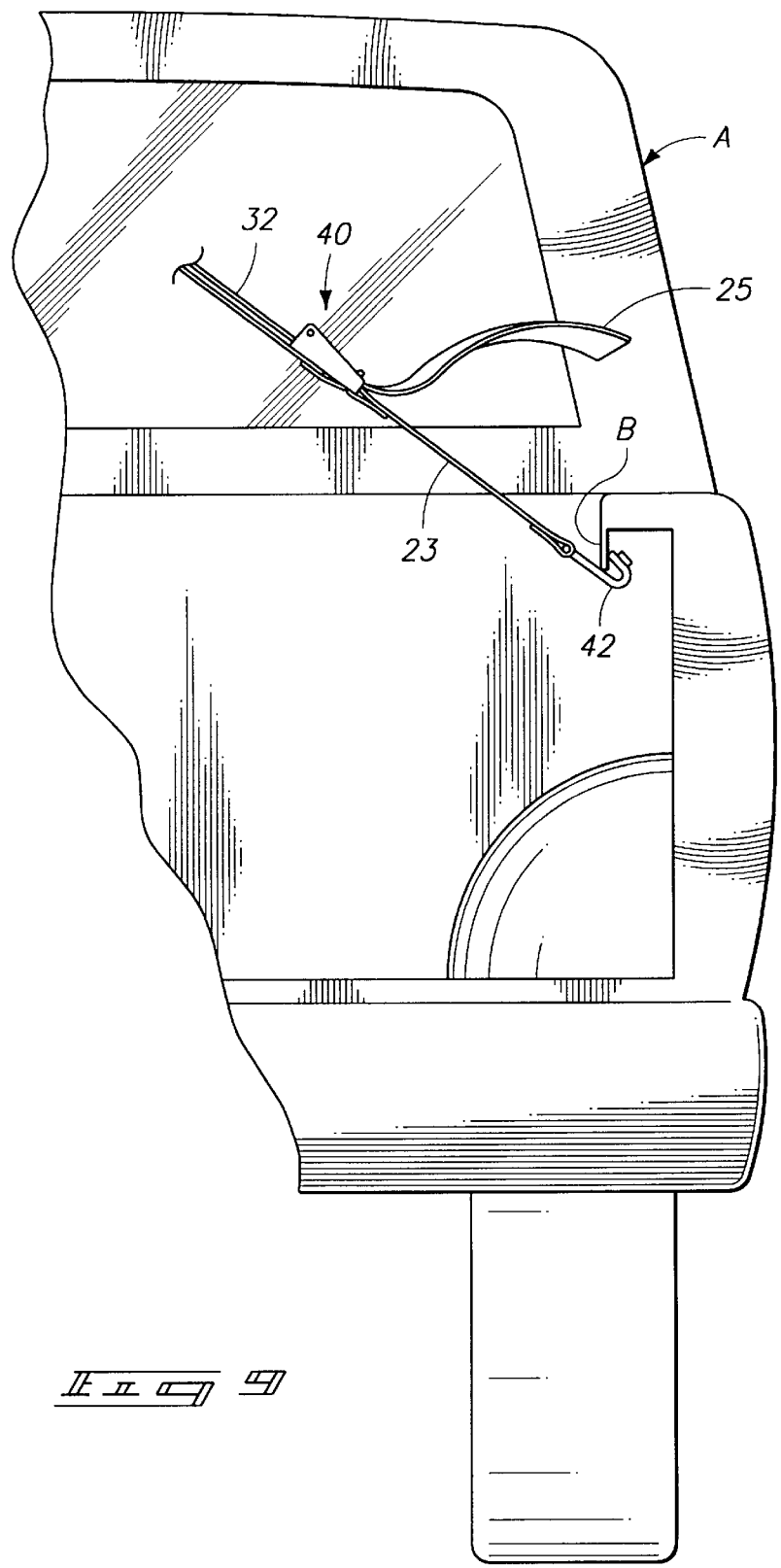
FIG. 9 is an environmental end elevational view showing how a tarp in accordance with the present invention may be secured to the bed of a pick-up truck.

At the edge of the tarp 10 of FIG. 2 are preferably attached anchors 42. More preferably, the anchors 42 are located at the end of the tension member 23 or 24 distal from the pulley 28. Turning to FIG. 5, a first embodiment of an anchor 42 is shown. In this embodiment the anchor is a hook, and can be used to engage a hole or lip, as shown for example in FIG. 9. FIG. 9 shows a partial end view of a pick-up truck A. To assist in visualization, the tarp material 22 is not shown, nor are various other components such as the sheath. The hook or anchor 42 is shown securely attached to a lip B in the bed of the pick-up truck. Turning to FIG. 6, an alternate embodiment of the anchor is shown. The anchor of FIG. 6 comprises an eyelet 46 on the tab 48 on the end of tension member 23 of FIG. 6, thus allowing for rope, twine or the like to be used to tie the tarp 10 to a remote tie-down point. Such a configuration can be employed where no holes or lips are present in which the hook-type anchor 42 can be engaged. A combination of both the hook-type anchor of FIG. 5 and a magnetic anchor can also be employed, as indicated in FIG. 7 wherein hook 42 and magnet 49 are shown in combination. Preferably, in each instance the anchor is installed at the end of a tab which extends slightly beyond the end tension member with which the anchor is associated.

Turning to FIG. 7, a side elevation view of portions of the adjustment mechanism 30 are shown. In particular, the locking mechanism 40 is shown in detail. The locking mechanism can comprise any mechanism for securing the loose end 25 of the strap 32, allowing the loose end to be freed at will by the user, but remaining secure otherwise. In the embodiment shown in FIG. 7 a compression buckle is shown in cross section. The compression buckle comprises a body 81 and a base 47 having two slots disposed therein. The first end of tension member 23 is looped through the first slot and the second slot. The end is then looped around the anchor 42 and then tacked back against the tension member itself to secure the tension member to the buckle. The second end of the strap 32 is looped through the pulley 28 and is returned to the compression buckle where it is passed through a slot between the base 47 and the securing lever 45 of the buckle. When the securing lever 45 is moved in a downward direction, strap 32 is compressed between the gripping surface 82 and the base 47 of the buckle, thusly securing the loose end of the strap in place. In an alternate embodiment, rather than require the user to actuate the securing mechanism, a spring loaded securing mechanism can be used which causes the buckle to hold the strap in a continual secured position (i.e., in a position in which the gripping surface is biased against the strap and the base) until released by the user.

Figure 10:
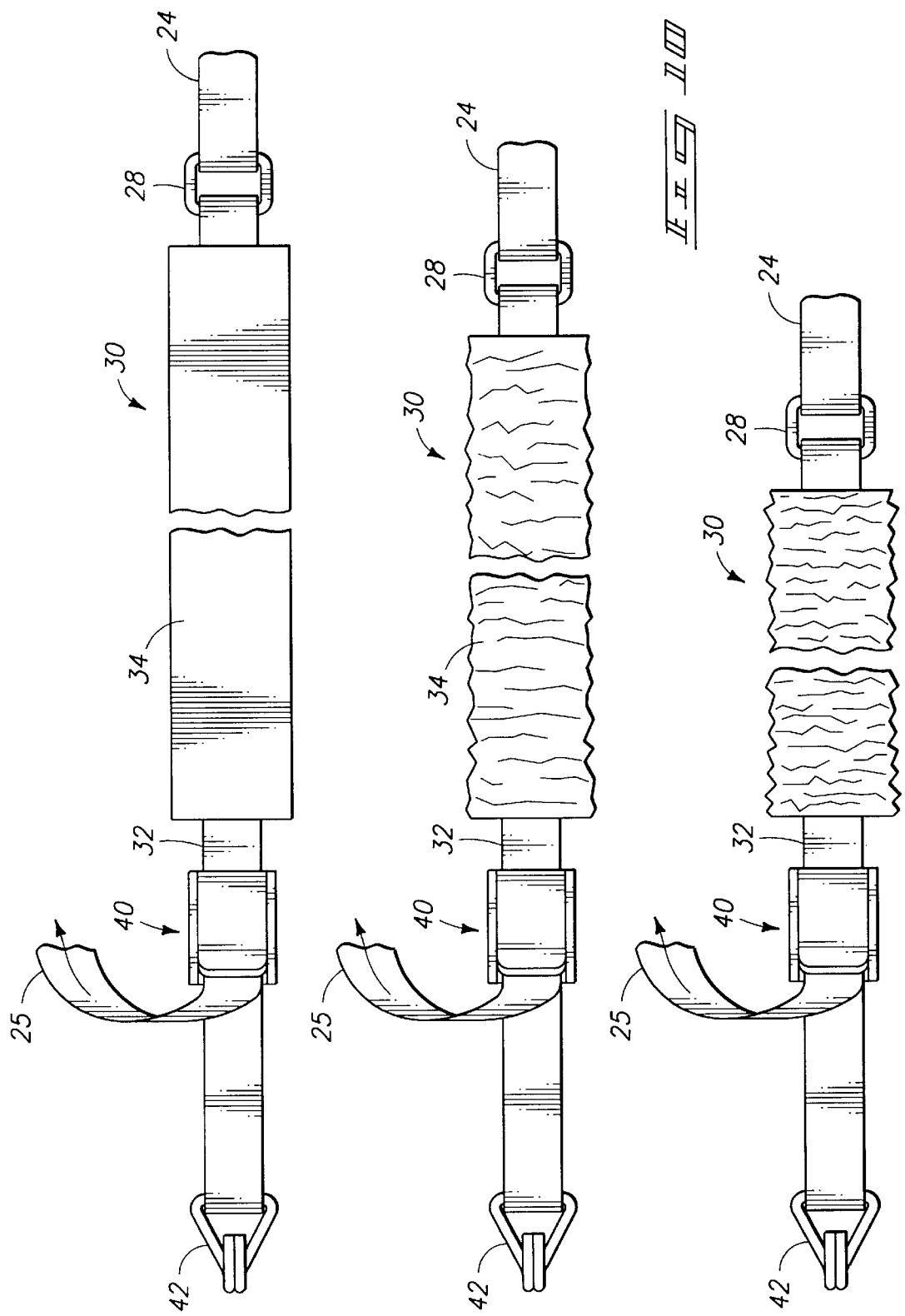
FIG. 10 is a sequential plan view showing the operation of the adjustable strap of the present invention and the shortening of the effective length of the strap.

The operation of a strap adjustment strap assembly is shown in sequential series in FIG. 10. In general, when the loose end 25 of the adjusting strap 32 is pulled there is a shortening of the effective length of the adjusting strap 32 between the locking mechanism 40 and the pulley 28, as shown in the three views from top to bottom. This shortening of distance causes the tarpaulin material to bunch up as it is squeezed between the locking mechanism 40 and the pulley 28. The effect of the adjusting strap 32 moving through the pulley 28 makes the tarpaulin material 22 bunch up in an essentially uniform manner (that is, there is not more material being compressed in one area over another area along the length of the strap). Once the desired contraction of the tarp about the load has been achieved, the free end 25 of the strap 32 can be secured with the locking mechanism 40. The drawings do not show the concomitant bunching of the tarp which occurs as a result of the shortening of the effective length of the adjusting strap 32.

The invention also provides for a method and apparatus to retrofit prior art tarps to allow them to operate in the manner described herein above. Turning to FIG. 11, a tarp adjusting apparatus 90 is shown. The apparatus comprises a backing 92 to which is attached a sheath 34 in the manner that a sheath is attached to the tarp material 22 in FIGS. 2 and 8. Also attached to the backing material are a locking mechanism 40, a pulley 28, a tension member 24, an anchor 42, and an adjusting strap 32. These components are configured as described above, and can accommodate the various embodiments described. The backing 92 can be secured to tarpaulin material 22 with any known method, including by providing the backing with an adhesive backing material on the side opposite the side on which the strap is mounted. The backing 92 can also be sewn to, fused to, glued to, riveted to, or otherwise attached to the tarp material 22.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A load conformable tarp, comprising:
   a base material;
   an adjusting strap having a first end secured to the base material and a second end;
   a locking mechanism secured to the base material and configured to temporarily secure the adjusting strap in variable positions; and
   a pulley throughwhich the second end of the adjusting strap is disposed to produce an adjusting strap loop of variable size in accordance with the adjusting strap position secured by the locking mechanism.

2. The load conformable tarp of claim 1 further comprising at least one strap securing device disposed over the adjusting strap between the adjusting strap first end and the locking mechanism to hold the adjusting strap in close proximity to the base material.

3. The load conformable tarp of claim 1 further comprising a sheath disposed over the adjusting strap loop and attached to the base material to form an elongated pocket having open ends and containing the adjusting strap loop, and wherein the pulley is disposed at one end of the sheath, and the locking mechanism is disposed at the other end of the sheath.

4. The load conformable tarp of claim 1 wherein the base material is defined by a periphery, and further comprising a plurality of anchors attached to the based material towards the periphery.

5. The load conformable tarp of claim 4 wherein the anchor comprises a hook-shaped clip.

6. The load conformable tarp of claim 4 wherein the anchor comprises a magnet.

7. The load conformable tarp of claim 6 wherein the anchor comprises a reinforced hole disposed within the base material.

8. The load conformable tarp of claim 4 further comprising a first tension member having a first end attached to the pulley and a second end terminating at one of the anchors at the periphery of the base material.

9. The load conformable tarp of claim 8 further comprising a second tension member having a first end attached to the locking mechanism and a second end terminating at another one of the anchors at the periphery of the base material.

10. The load conformable tarp of claim 1 further comprising a plurality of adjusting straps, selected ones of the adjusting straps having a first end secured to the base material and a second end;
   a plurality of locking mechanisms associated with the selected ones of the adjusting straps, each said locking mechanism being secured to the base material and configured to temporarily secure the associated adjusting strap ill variable positions.

11. The load conformable tarp of claim 10 further comprising a plurality of pulleys throughwhich the second end of the selected adjusting straps are individually disposed to produce a plurality of adjusting strap loops of variable size in accordance with the position of the selected adjusting strap as secured by the associated locking mechanism.

12. The load conformable tarp of claim 11 wherein the base material is defined by at least one essentially straight side, and wherein the selected adjusting straps are oriented in a direction essentially parallel to one another and essentially perpendicular to the at least one edge of the base material.

13. The load conformable tarp of claim 12 wherein the base material is further defined by a plurality of edges intersecting one another at a plurality of corners, and wherein other selected ones of the adjusting straps are oriented proximate to selected ones of the corners and such that a line along each of such other selected adjusting traps does not intersect one of the edges in a direction essentially perpendicular to the edge.

14. The load conformable tarp of claim 1 wherein the locking mechanism comprises a spring loaded gripping surface wherein the spring is biased to contact the gripping surface with the strap.

15. A tarp load conformable device comprising:
   a backing material;
   an adjusting strap having a first end secured to the backing material and a second end;
   a locking mechanism secured to the backing material and configured to temporarily secure the adjusting strap in variable positions; and a pulley attached to the backing material and through which the second end of the adjusting strap is disposed to produce an adjusting strap loop of variable size in accordance with the adjusting strap position secured by the locking mechanism.

16. The load conformable device of claim 15 further comprising a sheath disposed over the adjusting strap loop and attached to the backing material to form an elongated pocket having open ends and containing the adjusting strap loop, and wherein the pulley is disposed at one end of the sheath, and the locking mechanism is disposed at the other end of the sheath.

* * * * *